United States Patent
Pani et al.

(10) Patent No.: US 9,658,771 B2
(45) Date of Patent: May 23, 2017

(54) COMPUTER IMPLEMENTED USER INTERFACE FOR INPUTTING INDIAN LANGUAGE ALPHABETS

(71) Applicant: REVERIE LANGUAGE TECHNOLOGIES PVT LTD, Bangalore (IN)

(72) Inventors: Vivekananda Pani, Bangalore (IN); Sachindra Kumar Mohanty, Bangalore (IN)

(73) Assignee: REVERIE LANGUAGE TECHNOLOGIES PVT LTD, Karnataka (IN)

( * ) Notice: Subject to any disclaimer, the term of this patent is extended or adjusted under 35 U.S.C. 154(b) by 314 days.

(21) Appl. No.: 14/473,982

(22) Filed: Aug. 29, 2014

(65) Prior Publication Data

US 2015/0067575 A1  Mar. 5, 2015

(51) Int. Cl.
*G06F 3/0488* (2013.01)
*G06F 17/22* (2006.01)
*G06F 3/01* (2006.01)

(52) U.S. Cl.
CPC .......... *G06F 3/04886* (2013.01); *G06F 3/018* (2013.01); *G06F 17/2223* (2013.01)

(58) Field of Classification Search
CPC ... G06F 3/04886; G06F 3/018; G06F 17/2223
See application file for complete search history.

(56) References Cited

U.S. PATENT DOCUMENTS

| | | | | |
|---|---|---|---|---|
| 6,005,549 A * | 12/1999 | Forest | ..................... | G06F 3/011 345/157 |
| 7,414,616 B2 * | 8/2008 | Jayachandra | ........... | G06F 3/018 345/168 |
| 7,636,083 B2 * | 12/2009 | Aoki | ..................... | G06F 3/0237 345/171 |
| 7,707,515 B2 * | 4/2010 | Mistry | ..................... | G06F 3/018 715/773 |
| 7,721,222 B1 * | 5/2010 | Shaik | ..................... | G06F 3/018 345/156 |
| 8,005,664 B2 * | 8/2011 | Hanumanthappa | . | G06F 17/2223 704/4 |
| 8,078,984 B2 * | 12/2011 | Whytock | ............ | G06F 3/04886 345/173 |

(Continued)

*Primary Examiner* — Jung-Mu Chuang
(74) *Attorney, Agent, or Firm* — Barry Choobin; Patent 360 LLC (57) ABSTRACT

A computer implemented user interface which enables a user to input alphabets in at least one Indian language is disclosed herein. The user interface includes a display enabled keypad layout which in turn includes a default keypad layer, a first keypad layer, a second keypad layer and a third keypad layer. The default keypad layer comprises a plurality of alphabets represented as selectable vowels and consonants. The first keypad layer comprises the vowels and consonants, and a plurality of modifiers. The second keypad layer comprises a plurality of matras, a plurality of halants, the vowels, and the consonants. The third keypad layer comprises the matras and the modifiers. The keypad layers are configured to be incorporated onto the display enabled keypad layout and selectively displayed, based on at least the selection of a key on at least one of the keypad layers.

15 Claims, 8 Drawing Sheets

(56) References Cited

U.S. PATENT DOCUMENTS

| | | | |
|---|---|---|---|
| 9,304,602 B2 * | 4/2016 | Ghassabian | G06F 3/0236 |
| 2003/0119551 A1 * | 6/2003 | Laukkanen | G06F 3/0236 |
| | | | 455/556.1 |
| 2003/0122785 A1 * | 7/2003 | Jayachandra | G06F 3/018 |
| | | | 345/171 |
| 2005/0195171 A1 * | 9/2005 | Aoki | G06F 3/0237 |
| | | | 345/172 |
| 2011/0054882 A1 * | 3/2011 | Bhalerao | G06F 17/2705 |
| | | | 704/9 |
| 2015/0067575 A1 * | 3/2015 | Pani | G06F 3/04886 |
| | | | 715/773 |

\* cited by examiner

| अ | इ | ऍ | ऑ | क(क़) | च | ट | त | प | स |
|---|---|---|---|---|---|---|---|---|---|
| | | | | ख(ख़) | छ | ठ | थ | फ(फ़) | श(ष) |
| आ | ई | ए | ओ | ग(ग़) | ज(ज़) | ड(ड़) | द | ब | ह |
| | | | | घ | झ | ढ(ढ़) | ध | भ | |
| Shift | ऋ | ऐ | औ | ङ | ञ | ण | न | म | Delete |
| 123 | ऊ | ॠ | Space | .(l) | य | र | ल | Enter |
| | | | | . | | | व | |

FIG.3

| अ | इ | ऍ | ऒ | क(क़) | च | ट | त | प | स |
|---|---|---|---|---|---|---|---|---|---|
| | | | | ख(ख़) | छ | ठ | थ | फ(फ़) | श(ष) |
| आ | ई | ए | ओ | ग(ग़) | ज(ज़) | ड(ड़) | द | ब | ह |
| | | | | घ | झ | ढ(ढ़) | ध | भ | ०: |
| Shift | उ | ऐ | औ | ○ं | ○ँ | ण | न | म | Delete |
| ... | | | | ङ | ञ | | | | |
| 123 | ऊ | ॠ | Space | ।(|) | य | र | ल | Enter |
| | | | | . | | | | व | |

FIG.4

| ॽ | ि | ॅ | ॉ | क(क़) | च | ट | त | प | स |
|---|---|---|---|---|---|---|---|---|---|
| अ | इ | ऍ | ऑ | ख(ख़) | छ | ठ | थ | फ(फ़) | श(ष) |
| ा | ी | े | ो | ग(ग़) | ज(ज़) | ड(ड़) | द | ब | ह |
| आ | ई | ए | औ | घ | झ | ढ(ढ़) | ध | भ | ः |
| Shift | ॄ | ॆ | ॊ | ँ | ण | न | म | | Delete |
| ... | उ | ऐ | औ | ङ | ञ | | | | |
| 123 | ॢ | ॣ | Space | ,(l) | य | र | ल | Enter |
| | ऊ | ऋ | | . | | | | व | |

FIG.5

| अ | इ | एँ | ऑ | क(क़) | च | ट | त | प | स |
|---|---|---|---|---|---|---|---|---|---|
| आ | ई | ए | ओ | ग(ग़) | ज(ज़) | ड(ड़) | द | ब | ह |
| Shift | उ | ऐ | औ | ङ | ञ | ण | न | म | Delete |
| 123 | ऊ | ॠ | Space | | .(l) | य | र | ल | Enter |

FIG.6A

| | | | | ख(ख़) | छ | ठ | थ | फ(फ़) | श(ष) |
|---|---|---|---|---|---|---|---|---|---|
| | | | | घ | झ | ढ(ढ़) | ध | भ | |
| Shift | | | | | | | | | Delete |
| 123 | | | Space | | . | | | व | Enter |

FIG.6B

| ् | falling | ॅ | ॉ | क(क़) | च | ट | त | प | स |
|---|---|---|---|---|---|---|---|---|---|
| ा | ी | े | ो | ग(ग़) | ज(ज़) | ड(ड़) | द | ब | ह |
| Shift | ु | ै | ौ | ं | ँ | ण | न | म | Delete |
| 123 | ृ | ॄ | Space | | ,(।) | य | र | ल | Enter |

FIG. 7A

| अ | इ | ऍ | ऑ | ख(ख़) | छ | ठ | थ | फ(फ़) | श(ष) |
|---|---|---|---|---|---|---|---|---|---|
| आ | ई | ए | ओ | घ | झ | ढ(ढ़) | ध | भ | ः |
| Shift | उ | ऐ | औ | ङ | ञ | | | | Delete |
| 123 | ऊ | ऋ | Space | | . | | | व | Enter |

FIG. 7B

| अ | इ | ऍ | ऑ | क(क्) | च | ट | त | प | स |
|---|---|---|---|---|---|---|---|---|---|
| आ | ई | ए | ओ | ग(ग्) | ज(ज्) | ड(ड्) | द | ब | ह |
| Shift | उ | ऐ | औ | ं | ँ | ण | न | म | Delete |
| 123 | ऊ | ॠ | Space | | .(l) | य | र | ल | Enter |

FIG.8A

| | | | | ख(ख्) | छ | ठ | थ | फ(फ्) | श(ष) |
|---|---|---|---|---|---|---|---|---|---|
| | | | | घ | झ | ढ(ढ्) | ध | भ | ः |
| Shift | | | | ङ | ञ | | | | Delete |
| 123 | | | Space | . | | | | व | Enter |

FIG.8B

COMPUTER IMPLEMENTED USER INTERFACE FOR INPUTTING INDIAN LANGUAGE ALPHABETS

CROSS REFERENCE TO RELATED APPLICATIONS

This patent application claims the priority of the Indian Provisional Patent Application with serial number 3448/CHE/2013 filed on Jul. 31, 2013, and postdated to have a priority date on Aug. 31, 2013 with the title "Keypad Layout Based on Script Grammar", the contents of which is incorporated herein in entirety by the way of reference.

BACKGROUND

Technical Field

The embodiments herein relate to system and methods that facilitate character inputs on a computer implemented device/handheld device. Particularly, the embodiments herein relate to systems and methods that facilitate characters to be input in Indian languages. More particularly, the embodiments herein relate to a user interface that provides for characters to be input in Indian languages.

Description of the Related Art

A user interface provided on a touch screen based handheld device/computer enabled device typically incorporates a keypad which enables users to input the characters of a given language onto the device. Typically, the alphabets of a given language, for example, English language, are arranged across a plurality of layers. That is, lower case alphabets are arranged on a first layer, and the upper case characters are arranged on a second layer, and the layers are typically toggled using a toggle key or a 'SHIFT' key. In a touch screen based keypad, the keys displayed as a part of a particular layer are mapped to the respective characters.

The aforementioned layered keypad arrangement works effectively in case of English language alphabets or any other language based on Latin script, since, in case of these languages, the alphabets are always expressed/input linearly, and since these languages do not provide for joining at least two alphabets to form one alphabet. However, in case of Indian languages, which provide for joining of multiple alphabets to form a single alphabet, the layered keypad is rendered cumbersome.

Typically, an Indian language script is a combination of vowels, consonants, matras, halanta and nukta. A conventional keypad arrangement which follows the layered approach fails to accommodate the entire alphabet set, that is, vowels, consonants, matras, halanta and nukta in a single keypad layer. A user using the conventional keypad arrangement finds it difficult to use the keypad for inputting Indian language alphabets, since he would be required to toggle between more than two keypad layers to input the alphabets.

Further, the conventional keypad layouts for Indian languages are extensions of the keypads designed for English or any Latin Script based language. Such keypad layouts which are primary designed for linear sets of alphabets are not typically suitable for typing Indian language alphabets which provides for joining of two or more alphabets, to form a single alphabet. Further, the layout of the conventional keypads makes typing Indian language alphabets a cumbersome task.

Hence, there is a need for a user interface that is designed keeping in mind the properties of the script it inputs. Further, there is a need for a user interface that is easy to use, and possesses an aesthetic appeal. Still further, there is also a need for a user interface which aesthetically and conveniently accommodated all the alphabets, including vowels, consonants, matras, halanta and modifiers in minimum keypad layers and also provided for easy navigation across the layers.

The shortcomings of the conventional keypad designs and the solution envisaged by the embodiments herein will be explained in detail, in the following sections of the disclosure.

DEFINITION OF THE TERMS USED IN THE EMBODIMENTS HEREIN

The term 'Devanagari script' used in the embodiments herein refers to a writing nomenclature adhered to by a plurality of Indian languages including Hindi, Marathi, Konkani, Bodo, and Maithilli.

The term 'un-aspirated consonants' used in the embodiments herein refers, in the context of Indian Languages, to consonants which are pronounced with a slight breathing.

The term 'aspirated consonants' used in the embodiments herein refers, in the context of Indian Languages, to consonants which are pronounced with a heavy breathing.

The term 'matra' used in the embodiments herein refers, in the context of Indian Languages, to special characters generated as a result of combination of predetermined vowels and consonants. The matras can only be combined with consonants as per Indian languages.

The term 'halant' used in the embodiments herein refers, in the context of Indian Languages, to a special character that is used to suppress an inherent vowel that otherwise occurs with every consonant.

The term 'modifier' used in the embodiments herein refers, in the context of Indian Languages to a special character that is used to nasalize the vowels and consonants. Nasalization is a phenomenon of modifying the articulation and height of vowels and consonants phonemically.

Objects of the Embodiments Herein

An object of the embodiments herein is to provide a user interface that is highly intuitive and user-friendly.

Another object of the embodiments herein is to design a user interface specifically for Indian languages.

Yet another object of the embodiments herein is to provide a user interface that accommodates all the alphabets used in an Indian language, including vowels, consonants, matras, modifier and halanta, in an aesthetic and convenient manner.

Yet another object of the embodiments herein is to provide a user interface that is capable of displaying alphabets in any Indian language.

Yet another object of the embodiments herein is to provide a user interface that accommodates all the Indic scripts in a common keypad layout.

Yet another object of the embodiments herein is to provide a user interface that dynamically displays combinations of alphabets that could follow a particular typed alphabet.

Yet another object of the embodiments herein is to provide a keypad layout that places the alphabets in such a manner as to disallow typing/selection of improper alphabet combinations.

Yet another object of the embodiments herein is to provide a keypad layout which is simplistic and easy to use.

Yet another object of the embodiments herein is to provide a keypad layout that minimizes the probability of occurrence of erroneously typed alphabets.

Yet another object of the embodiments herein is to provide a keypad layout that minimizes the use of toggle keys by accommodating all the alphabets of an Indian language using minimum possible number of keys.

Yet another object of the embodiments herein is to provide a keypad layout that incorporates Indian language character keys aligned in a user-friendly manner and in an easy to access manner.

These and other objects and advantages of the embodiments herein will be apparent from the following detailed description read in conjunction with the accompanying drawings.

SUMMARY

The embodiments herein envisages a computer implemented user interface, the user interface configured to enable a user to input alphabets in at least one Indian language, the user interface comprising: at least one display enabled keypad layout and a plurality of keypad layers. The keypad layout comprising a plurality of keypad layers. Each of the keypad layers comprises alphabets of an Indian language and each of the keypad layers comprises the alphabets generated based on at least the script-grammar corresponding to the Indian language. The plurality of keypad layers comprises a default keypad layer comprising a plurality of alphabets represented as selectable vowels and consonants; a first keypad layer comprising the vowels and consonants, and a plurality of modifiers; a second keypad layer comprising a plurality of matras, a plurality of halants, the vowels, the consonants, and wherein the matras are formed by selectively combining the vowels and the consonants; and a third keypad layer comprising the plurality of matras and the plurality of modifiers. The plurality of keypad layers is configured to be incorporated onto the display enabled keypad layout and selectively displayed, based on at least a selection of a key to on condition in at least one of the plurality of the keypad layers.

An analyzer cooperating with the plurality of keypad layers, the analyzer configured to: trigger a display of the first keypad layer subsequent to the selection of a vowel on the default keypad layer, and trigger a display of the second keypad layer, in the event that a consonant has been selected from the default keypad layer; retrigger the display of the default keypad layer in the event that a modifier has been selected from the first keypad layer, and trigger a display of the third keypad layer in the event that a consonant has been selected from the first keypad layer, and generate a trigger to retain the display of the first keypad layer, in the event that a vowel has been selected via the first keypad layer retrigger the display of the default keypad layer subsequent to the selection of a halant from the second keypad layer, and retrigger the display of the first keypad layer, in the event that a matra has been selected via the second keypad layer; and retrigger the display of the default keypad layer, subsequent to the selection of a modifier from the third keypad layer, and retrigger the display of the default keypad layer, subsequent to the selection of a matra from the third keypad layer.

In accordance with one embodiment herein, the default keypad layer further comprises a default base layer and a default toggle layer, wherein the default base layer comprises un-aspirated consonants, and wherein the default toggle layer comprises aspirated consonants.

In accordance with one embodiment herein, the first keypad layer further comprises a first base layer and a first toggle layer, wherein the first base layer comprises unaspirated consonants and the modifiers, and wherein the first toggle layer includes only the aspirated consonants.

In accordance with one embodiment herein, the first keypad layer is configured to incorporate the modifiers on the first toggle layer, only after at least one vowel or at least one consonant has been selected by the user from the first base layer.

In accordance with one embodiment herein, the user interface further comprises an identifier configured to identify combinations of unpronounceable alphabets and combinations of alphabets that form an invalid phonetic sequence, the identifier further configured to cooperate with the user interface to disable selection of combination of alphabets that are identified as being unpronounceable and having an invalid phonetic sequence.

In accordance with one embodiment herein, the identifier is further configured to identify words comprising combination(s) of phonetically similar alphabets, the identifier further configured to store the words in a repository, the identifier still further configured to identify a sequence of alphabets selected by the user and automatically replace the selected sequence with a phonetically similar sequence of alphabets extracted from the repository, only in the event that the selected sequence is deemed to be grammatically incorrect.

In accordance with one embodiment herein, the analyzer having access to the script-grammar rules corresponding to the Indian language, the analyzer further configured to selectively disable the selection of predetermined alphabets on each of the plurality of keypad layers, in accordance with the script-grammar rules.

In accordance with one embodiment herein, a computer implemented method for enabling a user to input alphabets in at least one Indian Language, via a user interface has been envisaged. The method, in accordance with the embodiments herein comprises the following computer implemented steps of generating, based on at least script-grammar corresponding to an Indian language, a default keypad layer comprising a plurality of alphabets represented as selectable vowels and consonants; generating, based on the least script-grammar corresponding to the Indian language, a first keypad layer comprising the vowels and consonants and a plurality of modifiers; generating, based on at least the script-grammar corresponding to the Indian language, a second keypad layer comprising a plurality of matras, a plurality of halants, the vowels and the consonants, wherein the matras are formed by selectively combining the vowels and the consonants; generating, based on at least the script-grammar corresponding to the Indian language, a third keypad layer comprising the plurality of matras and the plurality of modifiers; integrating the default keypad layer, first keypad layer, second keypad layer and third keypad layer into a display enabled keypad layout; displaying the keypad layout on the user interface; providing the user with access to at least the default keypad layer of the keypad layout; triggering a display of the first keypad layer subsequent to the selection of a vowel on the default keypad layer, and triggering a display of the second keypad layer, in the event that a consonant has been selected from the default keypad layer; retriggering the display of the default keypad layer in the event that a modifier has been selected from the first keypad layer, and triggering a display of the third keypad layer in the event that a consonant has been selected from the first keypad layer, and generating a trigger to retain the display of the first keypad layer, in the event that a vowel has been selected via the first keypad layer; retriggering the display of the default keypad layer subsequent to the selection of a halant from the second keypad layer, and retriggering the display of the first keypad layer, in the event that a matra has been selected via the second keypad layer; and retriggering the display of the default keypad layer, subsequent to the selection of a modifier from the third keypad layer, and retriggering the display of the default keypad layer, subsequent to the selection of a matra from the third keypad layer.

In accordance with one embodiment herein, the step of generating a default keypad layer further comprises the following steps of generating a default base layer comprising unaspirated consonants; generating a default toggle layer comprising aspirated consonants; and integrating the default base layer and default toggle layer onto the default keypad layer.

In accordance with one embodiment herein, the step of generating a first keypad layer further comprises the following steps of generating a first base layer comprising the un-aspirated consonants and the modifiers; generating a first toggle layer, the first toggle layer having only the aspirated consonants; and integrating the first base layer and first toggle layer onto the first keypad layer.

In accordance with one embodiment herein, the step of generating a first toggle layer further includes the step of incorporating the modifiers on to the first toggle layer, only after at least one vowel or at least one consonant has been selected by the user from the first base layer.

In accordance with one embodiment herein, the method further comprises the following steps of identifying words having an invalid phonetic sequence and storing said words in a repository; identifying the sequence of alphabets keyed in by the user, and comparing the sequence of alphabets keyed-in by the user with the words stored in the repository, and determining whether the sequence of alphabets keyed in by the user form, at least a part of a word stored in the repository, cooperating with the plurality of keypad layers to identify the keys having alphabets, which in combination with the alphabets keyed-in by the user, would result in the formation of an unpronounceable word; and disabling the selection of the identified keys.

In accordance with one embodiment herein, the method further includes the following steps of identifying phonetically similar words, and storing said words in the repository; identifying a sequence of alphabets keyed-in by the user and automatically replacing the keyed-in sequence with a phonetically similar word extracted from the repository, only in the event that the keyed-in sequence is deemed to be grammatically incorrect.

According to one embodiment herein, a non transitory computer readable medium having computer readable instructions stored there upon, is provided. The computer readable instructions when executed by a processor, configured to cause a computer enabled device to generate, based on at least script-grammar corresponding to an Indian language, a default keypad layer comprising a plurality of alphabets represented as selectable vowels and consonants; to generate, based on the least script-grammar corresponding to the Indian language, a first keypad layer comprising the vowels and consonants and a plurality of modifiers; to generate, based on at least the script-grammar corresponding to the Indian language, a second keypad layer comprising a plurality of matras, a plurality of halants, the vowels, and the consonants, wherein the matras are formed by selectively combining the vowels and the consonants; to generate, based on at least the script-grammar corresponding to the Indian language, a third keypad layer comprising the plurality of matras and the plurality of modifiers, to integrate the default keypad layer, first keypad layer, second keypad layer and third keypad layer into a display enabled keypad layout; to display the keypad layout on a user interface of the computer enabled device, and provide at least one user with access to at least the default keypad layer of the keypad layout; to trigger a display of the first keypad layer subsequent to the selection of a vowel on the default keypad layer, and trigger a display of the second keypad layer, in the event that a consonant has been selected from the default keypad layer; to retrigger the display of the default keypad layer in the event that a modifier has been selected from the first keypad layer, and trigger a display of the third keypad layer in the event that a consonant has been selected from the first keypad layer, and generate a trigger to retain the display of the first keypad layer, in the event that a vowel has been selected via the first keypad layer; to retrigger the display of the default keypad layer subsequent to the selection of a halant from the second keypad layer, and retrigger the display of the first keypad layer, in the event that a matra has been selected via the second keypad layer; and to retrigger the display of the default keypad layer, subsequent to the selection of a modifier from the third keypad layer, and retrigger the display of the default keypad layer, subsequent to the selection of a matra from the third keypad layer.

In accordance with one embodiment herein, the computer readable instructions, when executed by a processor are further configured to enable a computer enabled device to: generate a default base layer comprising un-aspirated consonants; generate a default toggle layer comprising aspirated consonants; integrate the default base layer and default toggle layer onto the default keypad layer; generate a first base layer comprising the unaspirated consonants; generate a first toggle layer, the first toggle layer having only the aspirated consonants; integrate the first base layer and first toggle layer onto the first keypad layer; incorporate the modifiers on to the first toggle layer, only after at least one vowel or at least one consonant has been selected by the user from the first base layer; identify words having an invalid phonetic sequence and store said words in a repository; identify the sequence of alphabets keyed in by the user, and compare the sequence of alphabets keyed-in by the user with the words stored in the repository, and determine whether the sequence of alphabets keyed in by the user form, at least a part of a word stored in the repository; cooperate with the plurality of keypad layers to identify the keys having alphabets, which in combination with the alphabets keyed-in by the user, would result in the formation of an unpronounceable word; disable the selection of the identified keys; identify phonetically similar words, and storing the words in the repository; and identify a sequence of alphabets keyed-in by the user and automatically replacing the keyed-in sequence with a phonetically similar word extracted from the repository, only in the event that the keyed-in sequence is deemed to be grammatically incorrect.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The objects, features and the technical advantages envisaged by the embodiments herein will be apparent to those reasonably skilled in the art, from the following detailed description and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
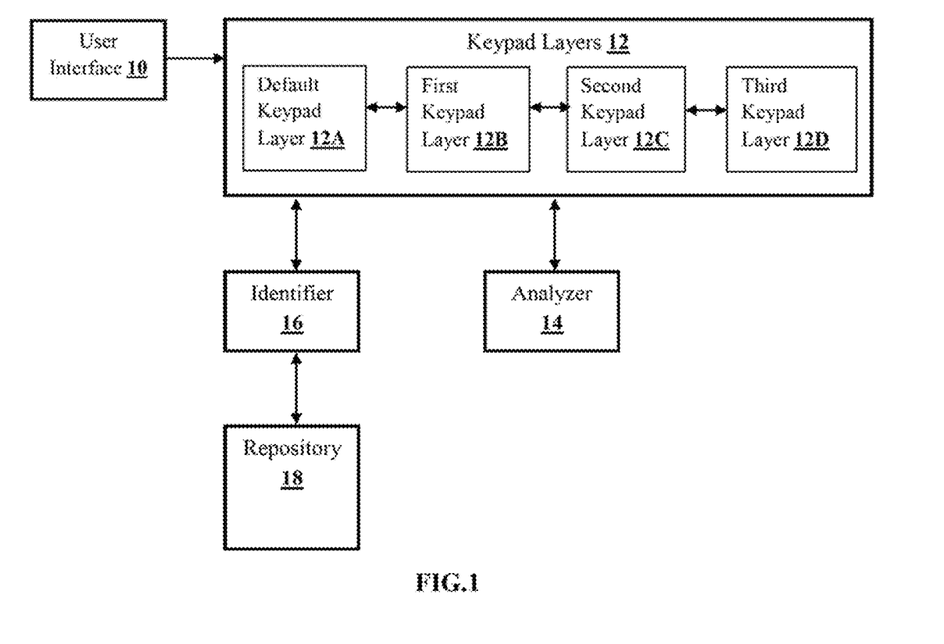
FIG. 1 is a system-level block diagram illustrating the functional components of the user interface, in accordance with the embodiments herein.

Referring to the accompanying drawings, and particularly to FIG. 1, a system level block diagram 100 incorporating the functional components of the computer implemented user interface 10 configured to enable a user to input alphabets in at least one Indian language, preferably Hindi Language. The Indian Language 'Hindi' is used only to exemplify the features of the user interface envisaged by the embodiments herein, however the user interface has been adapted to incorporate any Indian Language having a script-grammar. In accordance with the embodiments herein, the computer implemented user interface is configured to supports scripts including but not restricted to Assamese, Bengali, Devanagari (Hindi, Marathi, Nepali & Konkani), Gujarati, Kannada, Malayalam, Odia, Punjabi, Tamil and Telugu.

The user interface 10, in accordance with one embodiment herein comprises at least one display enabled keypad layout 12. The display enabled keypad layout 12 (referred to as keypad layout, hereafter) is configured to display alphabets in at least one Indian language.

In accordance with the embodiments herein, the keypad layout 12 comprises alphabets generated based on the script grammar corresponding to the underlying language, preferably Indian language. The keypad layout 12 has been designed taking into consideration the script grammar, and since the script grammar of the (Indian) language is taken into consideration, the keypad layout envisaged by the embodiments herein provides 'simple to use' touch enabled keys which provide for joining alphabets in a simplified manner. Further, the keypad layout envisaged by the embodiments herein strategically positions the keys corresponding to the alphabets so that it is easy for the user to type complicated words, such as the ones that necessitate joining more than two alphabets together, along with, for example, a modifier/halant. The keypad layout 12 is configured to display alphabets corresponding to a plurality of Indian languages including but not restricted to Hindi, Urdu, Sanskrit, and Assamese.

In accordance with one embodiment herein, the keypad layout 12 includes a plurality of keypad layers. The keypad layers include but are not restricted to the default keypad layer 12A (Exemplified in FIG. 3), the first keypad layer 12B (Exemplified in FIG. 4), the second keypad layer 12C (Exemplified in FIG. 5) and the third keypad layer 12D. The keypad layout and the keypad layers are exemplary in nature and should not be construed in a limiting sense.

Figure 3:
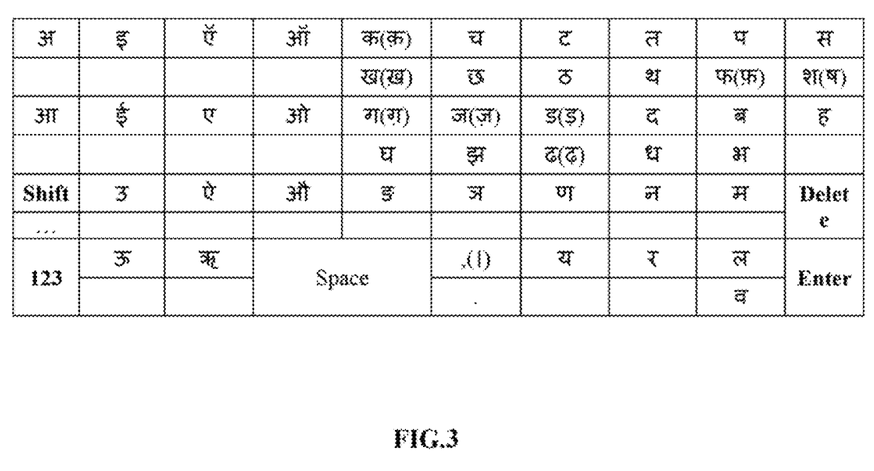
FIG. 3 exemplifies the default keypad layer, in accordance with the embodiments herein.
Figure 4:
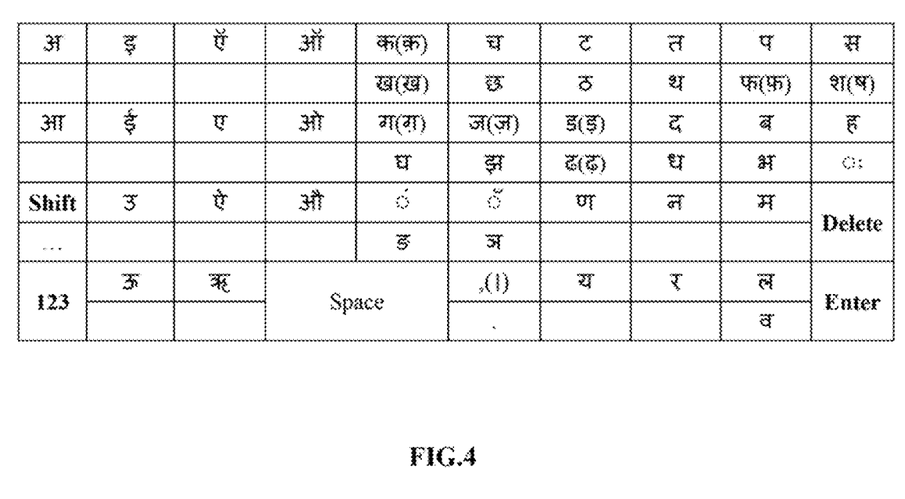
FIG. 4 exemplifies the first keypad layer, in accordance with the embodiments herein.

In accordance with one embodiment herein, the default keypad layer 12A, as the name suggests is the keypad layer displayed on the user interface, at the first instance, to the user. The default keypad layer 12A comprises a plurality of alphabets represented as selectable, preferably touch selectable vowels and consonants. In accordance with the embodiments herein, the first keypad layer 12B includes the plurality of consonants and the plurality of vowels (the consonants and vowels that are a part of the default layer 12A as well), and a plurality of modifiers. The default keypad layer 12A display the vowels and consonants, whereas the first keypad layer 12B, which is an extension of the default keypad layer 12A, includes a plurality of modifiers, in addition to the vowels and consonants. The first keypad layer 12B of the embodiments herein incorporates the set of vowels, consonants and the modifiers and enables the user to conveniently perform complex operations including attaching a modifier with a vowel, and attaching a modifier.

Figure 5:
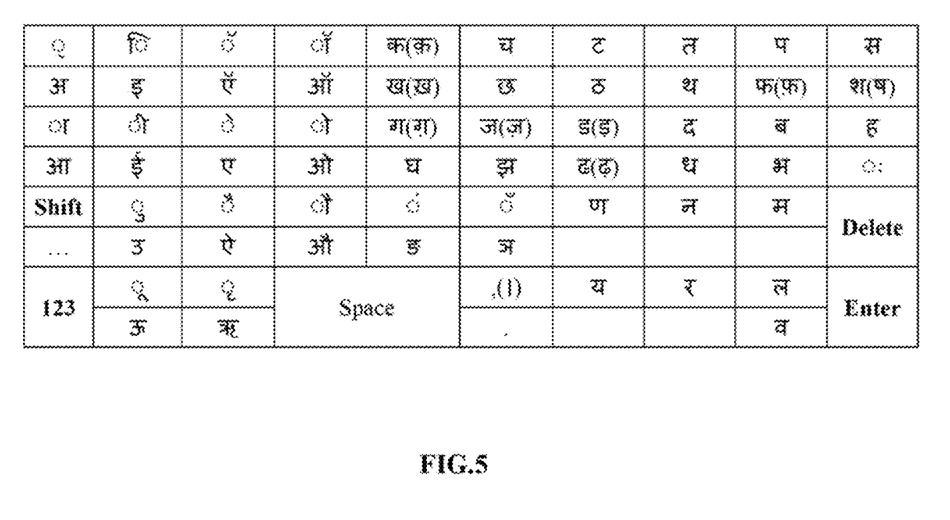
FIG. 5 exemplifies the second keypad layer, in accordance with the embodiments herein.

In accordance with one embodiment herein, the second keypad layer 12C comprises a plurality of matras, a plurality of halants and the plurality of vowels and consonants (the consonants and vowels that are a part of the default layer 12A, and the first keypad layer 12B as well). In the context of any Indian language, more so in the context of Hindi language, matras are a combination of vowels and consonants, and the matras are attached only to consonants. Each of the keypad layers 12A, 12B, 12C and 12D are configured to be selectively displayed as at least a part of the keypad layout 12, based on the selection of a key present on at least one of the keypad layers 12A, 12B, 12C, and 12D.

In accordance with one embodiment herein, the user interface 10 further includes an analyzer denoted by reference numeral 14. The analyzer 14, in accordance with the embodiments herein provides for dynamically shifting between displaying each of the keypad layers 12A, 12B, 12C, and 12D, based on a predetermined rule(s). The predetermined rule implemented by the analyzer 14 triggers selective display of each of the layers 12A, 12B and 12C of the keypad layout based on a key selected by the user via at least one of the layers 12A, 12B, 12C, and 12D.

Since the default keypad layer 12A is the layer displayed to the user accessing the user interface 10, the analyzer 14 at a first instance, cooperates with the default keypad layer 12A to determined whether a vowel has been selected by the user from the default keypad layer 12A or whether a consonant has been selected by the user from the default keypad layer 12A. The default keypad layer 12A comprises vowels and consonants as explained earlier. The analyzer 14, in accordance with the embodiments herein triggers a display of the first keypad layer 12B subsequent to the user selecting a vowel from the default keypad layer 12A, such a triggering is based on the rule that selection of a vowel is always followed by selection of either a vowel or a consonant or a modifier. In the event that a consonant is selected by the user via the default keypad 12A, the analyzer 14 triggers a display of the second keypad layer 12C. The triggering of the display of the second keypad layer (subsequent to the selection of the consonant from the default keypad layer 12A) is based on the rule that the selection of a consonant can be followed by selection of either a vowel or a consonant or a matra or a halant.

Subsequently, the analyzer 14 cooperates with the first keypad layer 12B which comprises the plurality of vowels, consonants and a plurality of modifiers. The analyzer 14 determines whether a vowel or a consonant or a modifier has been selected by the user via the first keypad layer 12B. In the event that a vowel has been selected via the first keypad layer 12B, the analyzer generates a trigger to retain the display of the first keypad layer 12B since the selection of the vowel/consonant can be followed by the selection of another vowel/consonant/modifier. However, in the event that a modifier has been selected via the first keypad layer 12B, the analyzer 14 retriggers the display of the default keypad layer 12A comprising vowels and consonants, since a modifier has to be followed by either a vowel or a consonant, and since a modifier cannot precede/succeed another modifier. Further, if a consonant has been selected by the user via the first keypad layer 12B, the analyzer 14 triggers a display of the third keypad layer 12D comprising the plurality of modifiers and the plurality of matras, since selection of a consonant can be optionally followed by a selection of a modifier or a matra. However, if the user does not intend to select a modifier/matra subsequent to selecting a consonant, he is provided with the option of navigating to the first keypad layer 12B, using a predetermined key (for example, the 'BACK' key) present on the third keypad layer 12D.

In accordance with one embodiment herein, the analyzer 14 is further configured to retrigger the display of the default keypad layer 12A subsequent to the selection of a halant from the second keypad layer 12C, based on a rule that the selection of a halant can be followed either by a vowel or a consonant. Further the analyzer 14 retriggers the display of the first keypad layer 12B, in the event that a matra has been selected via the second keypad layer 12C, based on a rule that the selection of a matra, and the joining of the selected matra with a consonant can be followed by selection of either a vowel or a consonant (present on the first keypad layer 12B). Alternately, the display of the default keypad layer 12A can also be retriggered by the analyzer 14, in response to the selection of a matra from the second keypad layer 12C.

In accordance with one embodiment herein, the analyzer 14 is configured to retrigger the display of the default keypad layer 12A, subsequent to the selection of a modifier/matra from the third keypad layer 12D, based on a rule that the selection of a modifier or a matra, and the joining of the selected modifier/matra has to be followed by either a vowel or a consonant (part of the default keypad layout 12A).

Figure 6A:
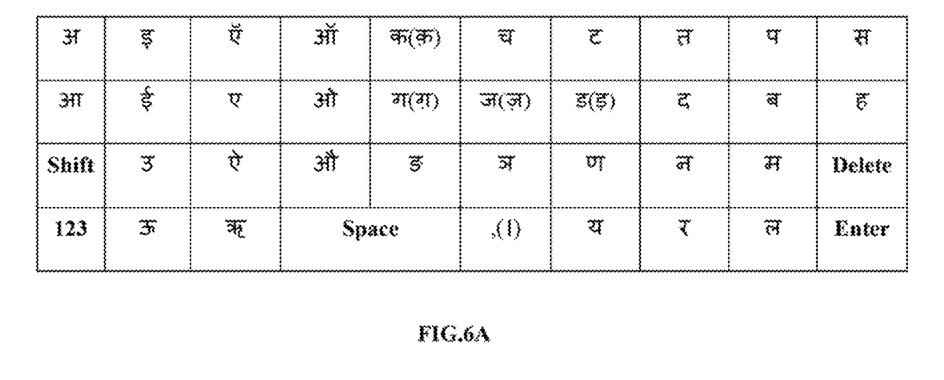
FIGS. 6A and 6B exemplify the default base layer, and default toggle layer, in accordance with the embodiments herein.
Figure 6B:
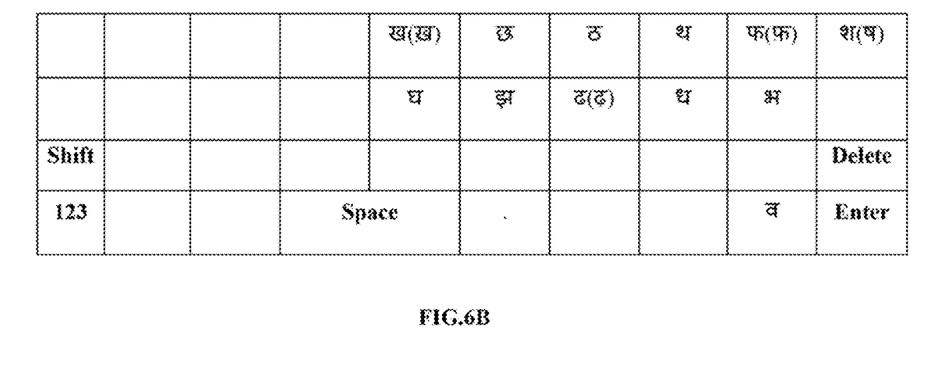

In accordance with one embodiment herein, the default keypad layer 12A further comprises a default base layer (illustrated in FIG. 6A) and a default toggle layer (illustrated in FIG. 6B). The default base layer comprises a plurality of vowels and a plurality of unaspirated consonants (pronounced with a slight breathing by the user). The default toggle layer includes only aspirated consonants (pronounced with a hard breathing by the user), which are an extension of the un-aspirated consonants as per any given Indian language.

Figure 7A:
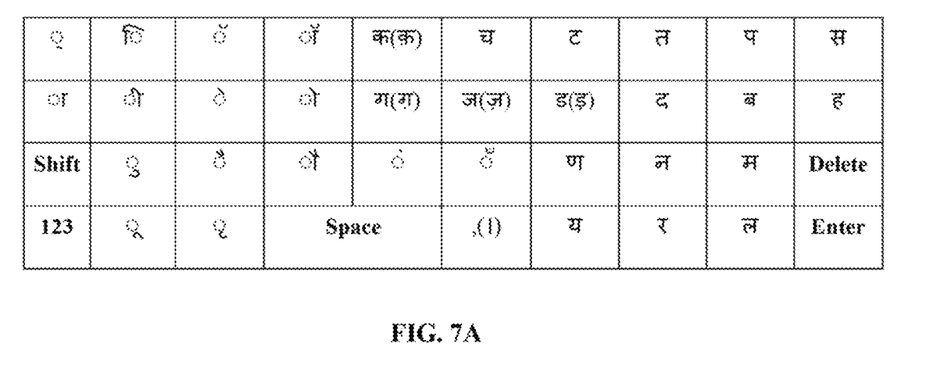
FIGS. 7A and 7B exemplify the first base layer, and first toggle layer, in accordance with the embodiments herein.
Figure 7B:
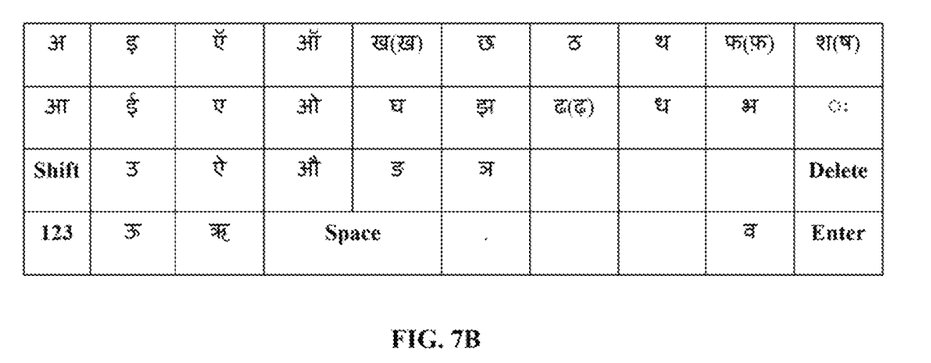
Figure 8A:
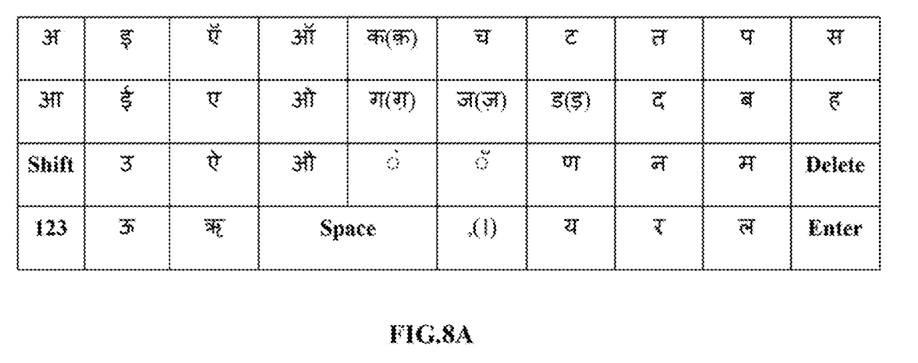
FIGS. 8A and 8B exemplify the second base layer, and second toggle layer, in accordance with the embodiments herein.
Figure 8B:
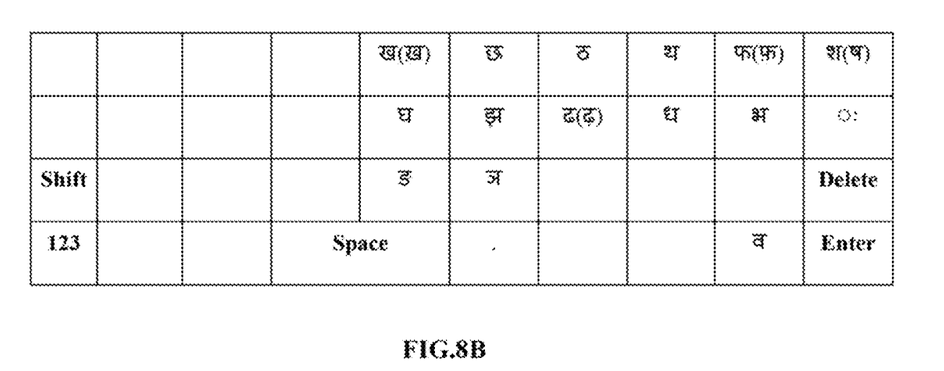

In accordance with one embodiment herein, the first keypad layer 12B comprises a first base layer (illustrated in FIG. 7A) and a first toggle layer (illustrated in FIG. 7B), wherein the first base layer comprises vowels, unaspirated consonants and the modifiers, and the first toggle layer includes only the vowels and aspirated consonants. The user interface 10 of the embodiments herein enables the user to shift between the default base layer and the default toggle layer, using a pre-determined key, for example the 'SHIFT' key provided on the user interface 10. Similarly, the first base layer and the first default layer can also be accessed (in an alternating manner) using the 'SHIFT' key. The first keypad layer 12B is configured to incorporate the modifiers on the first toggle layer, only after at least one vowel or at least one consonant has been selected by the user from the first base layer. In accordance with the embodiments herein, the unaspirated consonants present on the default/first base layer are replaced by the corresponding aspirated consonants on the default/first toggle layer. The similarity in the location of the aspirated consonants and the corresponding un-aspirated consonants provides a user with better character recognition and recollection. In accordance with the embodiments herein, the second keypad layer 12 comprises a second base layer (illustrated in FIG. 8A) and a second toggle layer (illustrated in FIG. 8B). The second base layer comprises vowels, unaspirated consonants and the modifiers, and the first toggle layer includes only the aspirated consonants.

In accordance with one embodiment herein, the user interface 10 further comprises an identifier 16 configured to identify unpronounceable alphabets (unpronounceable words) or combinations of alphabets that form an invalid phonetic sequence (words being unpronounceable by the virtue of having an invalid phonetic sequence). The unpronounceable words can be manually input to the identifier 16 via the user interface 10. Alternately, the identifier 16 is configured to track and store the unpronounceable words keyed-in by the user, thereby creating a list (stored in repository 18) of unpronounceable words. The list is subsequently updated at pre-determined time intervals, with the unpronounceable words keyed-in by the user. Further, the identifier 16 cooperates with the user interface 10 and subsequently with the plurality of keypad layers 12A, 12B, 12C and 12D in order to disable the sequential selection of predetermined keys that would lead to the formation of unpronounceable/invalid words. The identifier 16 cooperates with the plurality of keypad layers 12A, 12B, 12C and 12D to identify (track) the key strokes provided by the user, and subsequently compares the sequence of alphabets generated as a resultant of the key strokes, with the unpronounceable/invalid phonetic sequences (words available in the list), in order to determine the degree of similarity between the sequence of alphabets generated as a result of key strokes provided by the user and the unpronounceable words stored in the repository 18.

Subsequently, the identifier dynamically identifies the keys (on the plurality of keypad layers 12A, 12B, 12C and 12D) that, when used as an input mode would generate unpronounceable/invalid words, when combined with the sequence of alphabets generated as a result of key strokes provided by the user. Subsequently, the identifier 16 dynamically disables (on the keypad layout 12, i.e., on the keypad layers 12A, 12B, 12C and 12D) the selection of such keys. For example, if in a given Indian language, if there are no words starting with a particular alphabet, then the identifier 16 dynamically disables the key corresponding to such an alphabet, whenever a new word (sequence of alphabets) is to be typed. Further, in case of Devanagari script, a nasal modifier cannot be followed immediately by another modifier, and therefore, as soon as a modifier has been typed, the identifier 16 cooperates with the plurality of keypad layers 12A, 12B, 12C and 12D to temporarily disable the keys corresponding to the modifiers.

The identifier 16, in accordance with one embodiment herein is further configured to identify phonetically similar words, and subsequently store the words (phonetically similar words) in the repository 18. The identifier 16 identifies a sequence of alphabets selected by the user and automatically replaces the selected sequence with a phonetically similar sequence of alphabets extracted from the repository 18, only in the event that the selected sequence is deemed, by the identifier 16 to be grammatically incorrect/unpronounceable.

Figure 2:
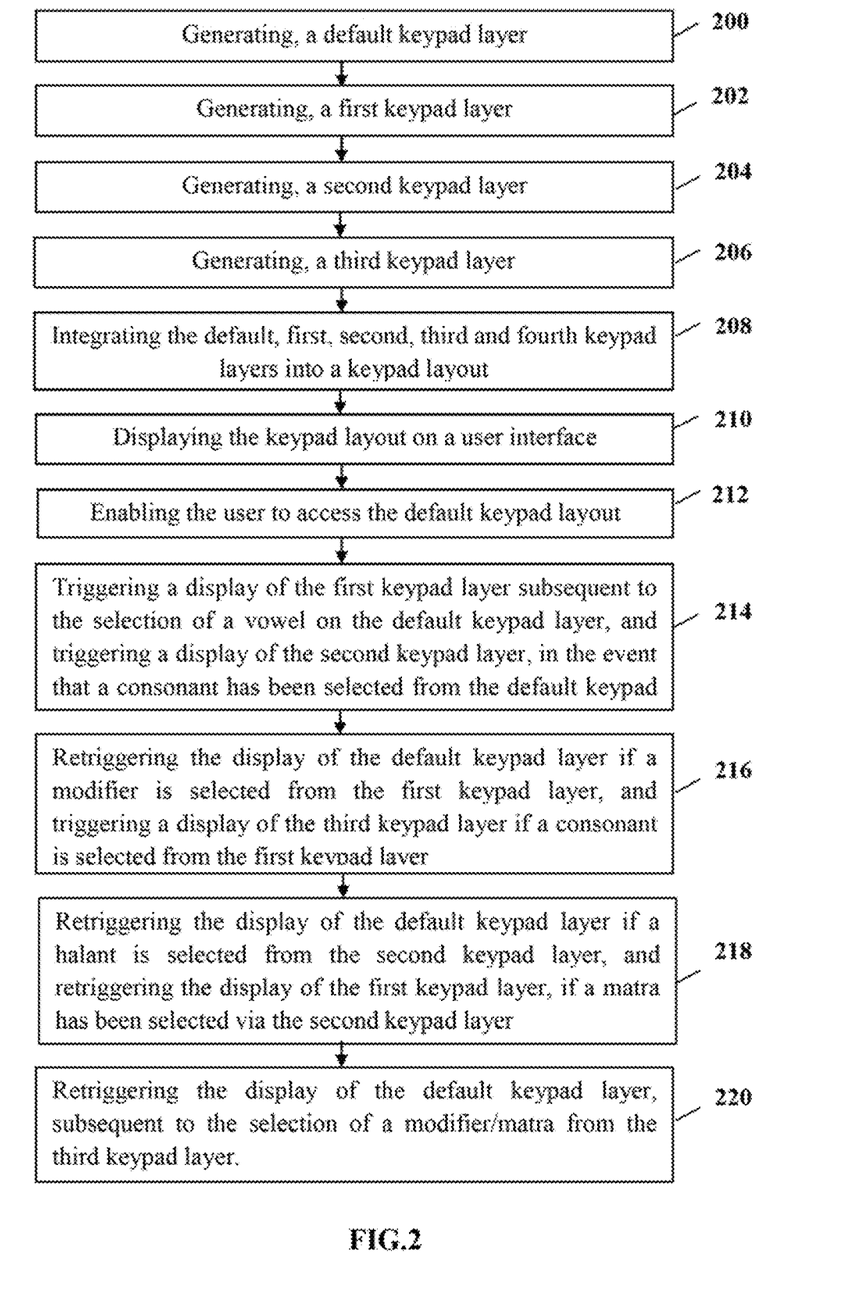
FIG. 2 is a flowchart illustrating the steps involved in the method for enabling a user to input alphabets in at least one Indian Language, in accordance with the embodiments herein.

Referring to FIG. 2, there is shown a flow chart illustrating the steps involved in the computer implemented method for enabling a user to input alphabets in at least one Indian Language, via a user interface. The method, in accordance with the embodiments herein comprises the following computer implemented steps of generating, based on at least script-grammar corresponding to an Indian language, a default keypad layer comprising a plurality of alphabets represented as selectable vowels and consonants (200); generating, based on the least script-grammar corresponding to the Indian language, a first keypad layer comprising the vowels and consonants and a plurality of modifiers (202); generating, based on at least the script-grammar corresponding to the Indian language, a second keypad layer comprising a plurality of matras, a plurality of halants, the vowels and the consonants, wherein the matras are formed by selectively combining the vowels and the consonants (204); generating, based on at least the script-grammar corresponding to the Indian language, a third keypad layer comprising the plurality of matras and the plurality of modifiers (206); integrating the default keypad layer, first keypad layer, second keypad layer and third keypad layer into a display enabled keypad layout (208); displaying the keypad layout on the user interface (210); providing the user with access to at least the default keypad layer of the keypad layout (212); triggering a display of the first keypad layer subsequent to the selection of a vowel on the default keypad layer, and triggering a display of the second keypad layer, in the event that a consonant has been selected from the default keypad layer (214); retriggering the display of the default keypad layer in the event that a modifier has been selected from the first keypad layer, and triggering a display of the third keypad layer in the event that a consonant has been selected from the first keypad layer, and generating a trigger to retain the display of the first keypad layer, in the event that a vowel has been selected via the first keypad layer (216); retriggering the display of the default keypad layer subsequent to the selection of a halant from the second keypad layer, and retriggering the display of the first keypad layer, in the event that a matra has been selected via the second keypad layer (218); and retriggering the display of the default keypad layer, subsequent to the selection of a modifier from the third keypad layer, and retriggering the display of the default keypad layer, subsequent to the selection of a matra from the third keypad layer (220).

In accordance with one embodiment herein, the step of generating a default keypad layer further comprises the following steps: generating a default base layer comprising un-aspirated consonants; generating a default toggle layer comprising aspirated consonants; and integrating the default base layer and default toggle layer onto the default keypad layer.

In accordance with one embodiment herein, the step of generating a first keypad layer further comprises the following steps of: generating a first base layer comprising the un-aspirated consonants and the modifiers; generating a first toggle layer, the first toggle layer having only the aspirated consonants; and integrating the first base layer and first toggle layer onto the first keypad layer.

In accordance with one embodiment herein, the step of generating a first toggle layer further includes the step of incorporating the modifiers on to the first toggle layer, only after at least one vowel or at least one consonant has been selected by the user from the first base layer.

In accordance with one embodiment herein, the method further comprises the following steps: identifying words having an invalid phonetic sequence and storing said words in a repository; identifying the sequence of alphabets keyed in by the user, and comparing the sequence of alphabets keyed-in by the user with the words stored in the repository, and determining whether the sequence of alphabets keyed in by the user form, at least a part of a word stored in the repository; cooperating with the plurality of keypad layers to identify the keys having alphabets, which in combination with the alphabets keyed-in by the user, would result in the formation of an unpronounceable word; and disabling the selection of the identified keys.

In accordance with one embodiment herein, the method further includes the following steps: identifying phonetically similar words, and storing said words in the repository; identifying a sequence of alphabets keyed-in by the user and automatically replacing the keyed-in sequence with a phonetically similar word extracted from the repository, only in the event that the keyed-in sequence is deemed to be grammatically incorrect.

The embodiments herein further envisages a non transitory computer readable medium having computer readable instructions stored thereupon, the computer readable instructions when executed by a processor, configured to cause a computer enabled device to: generate, based on at least script-grammar corresponding to an Indian language, a default keypad layer comprising a plurality of alphabets represented as selectable vowels and consonants; generate, based on the least script-grammar corresponding to the Indian language, a first keypad layer comprising the vowels and consonants and a plurality of modifiers; generate, based on at least the script-grammar corresponding to the Indian language, a second keypad layer comprising a plurality of matras, a plurality of halants, the vowels, and the consonants, wherein the matras are formed by selectively combining the vowels and the consonants; generate, based on at least the script-grammar corresponding to the Indian language, a third keypad layer comprising the plurality of matras and the plurality of modifiers; integrate the default keypad layer, first keypad layer, second keypad layer and third keypad layer into a display enabled keypad layout; display the keypad layout on a user interface of the computer enabled device, and provide at least one user with access to at least the default keypad layer of the keypad layout; trigger a display of the first keypad layer subsequent to the selection of a vowel on the default keypad layer, and trigger a display of the second keypad layer, in the event that a consonant has been selected from the default keypad layer, retrigger the display of the default keypad layer in the event that a modifier has been selected from the first keypad layer, and trigger a display of the third keypad layer in the event that a consonant has been selected from the first keypad layer, and generate a trigger to retain the display of the first keypad layer, in the event that a vowel has been selected via the first keypad layer, retrigger the display of the default keypad layer subsequent to the selection of a halant from the second keypad layer, and retrigger the display of the first keypad layer, in the event that a matra has been selected via the second keypad layer; and retrigger the display of the default keypad layer, subsequent to the selection of a modifier from the third keypad layer, and retrigger the display of the default keypad layer, subsequent to the selection of a matra from the third keypad layer.

In accordance with one embodiment herein, the computer readable instructions, when executed by a processor are further configured to enable a computer enabled device to: generate a default base layer comprising un-aspirated consonants; generate a default toggle layer comprising aspirated consonants; integrate the default base layer and default toggle layer onto the default keypad layer, generate a first base layer comprising the unasprated consonants and the modifiers; generate a first toggle layer, the first toggle layer having only the aspirated consonants; integrate the first base layer and first toggle layer onto the first keypad layer; incorporate the modifiers on to the first toggle layer, only after at least one vowel or at least one consonant has been selected by the user from the first base layer; identify words having an invalid phonetic sequence and store said words in a repository; identify the sequence of alphabets keyed in by the user, and compare the sequence of alphabets keyed-in by the user with the words stored in the repository, and determine whether the sequence of alphabets keyed in by the user form, at least a part of a word stored in the repository; cooperate with the plurality of keypad layers to identify the keys having alphabets, which in combination with the alphabets keyed-in by the user, would result in the formation of an unpronounceable word; disable the selection of the identified keys; identify phonetically similar words, and storing the words in the repository; and identify a sequence of alphabets keyed-in by the user and automatically replacing the keyed-in sequence with a phonetically similar word extracted from the repository, only in the event that the keyed-in sequence is deemed to be grammatically incorrect.

The technical advantages envisaged by the embodiments herein include the realization of a user interface that is highly intuitive and user-friendly. The user interface envisaged by the embodiments herein is design specifically for script based Indian languages. The user interface accommodates all the alphabets used in an Indian language, including vowels, consonants, matras, modifier and halanta, in an aesthetic and convenient manner. Further, the user interface is capable of displaying alphabets in any Indian language. The user interface accommodates the Indic scripts in a common keypad layout and dynamically displays combinations of alphabets that could follow a particular typed alphabet. Further, the keypad layout envisaged by the embodiments herein strategically places the alphabets in such a manner as to disallow typing/selection of improper alphabet combinations. One more object of the embodiments herein is to provide a keypad layout that minimizes the probability of occurrence of erroneously typed alphabets. The keypad layout envisaged by the embodiments herein minimizes the use of toggle keys by accommodating all the alphabets of an Indian language using minimum possible number of keys. Further, the keypad layout that incorporates Indian language character keys aligned in a user-friendly manner and in an easy to access manner.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the embodiments herein.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented system for enabling a user to input alphabets in an Indian language, said system comprising a user interface on a display and an analyzer, said user interface comprising:
at least one display enabled keypad layout, said keypad layout comprising a plurality of keypad layers, each of said keypad layers incorporating the alphabets of the Indian language as selectable keys, said alphabets generated based on a script-grammar corresponding to the Indian language, said plurality of keypad layers comprising:
a default keypad layer comprising a plurality of alphabets represented as selectable vowels and consonants;
a first keypad layer comprising the vowels and consonants, and a plurality of modifiers;
a second keypad layer comprising a plurality of matras, a plurality of halants, the vowels, the consonants, wherein said matras are formed by selectively combining the vowels and the consonants; and
a third keypad layer comprising the plurality of matras and the plurality of modifiers;

said plurality of keypad layers are incorporated onto the display enabled keypad layout and selectively displayed, based on selection of a key on at least one of said keypad layers;

said analyzer cooperating with said user interface:
triggers a display of the first keypad layer subsequent to the selection of a vowel on the default keypad layer, and triggers a display of the second keypad layer, in an event that a consonant has been selected from the default keypad layer;
retriggers the display of the default keypad layer in an event that a modifier has been selected from the first keypad layer, and triggers a display of the third keypad layer in an event that a consonant has been selected from the first keypad layer, and generates a trigger to retain the display of the first keypad layer, in an event that a vowel has been selected from the first keypad layer;
retriggers the display of the default keypad layer subsequent to selection of a halant from said second keypad layer, and retriggers the display of the first keypad layer, in an event that a matra has been selected from said second keypad layer: and
retriggers the display of the default keypad layer, subsequent to selection of a modifier from the third keypad layer, and retriggers the display of the default keypad layer, subsequent to selection of a matra from the third keypad layer.

2. The display enabled keypad layout as claimed in claim 1, wherein the default keypad layer further comprises a default base layer and a default toggle layer, wherein said default base layer comprises un-aspirated consonants, and wherein said default toggle layer comprises aspirated consonants.

3. The display enabled keypad layout as claimed in claim 1, Wherein the first keypad layer further comprises a first base layer and a first toggle layer, wherein said first base layer comprises un-aspirated consonants and the modifiers, and wherein said first toggle layer includes only aspirated consonants.

4. The display enabled keypad layout as claimed in claim 3, wherein the first keypad layer incorporates said modifiers on the first toggle layer only after at least one vowel or at least one consonant has been selected by the user from the first base layer.

5. The user interface as claimed in claim 1, wherein said user interface further comprises an identifier identifies words having an invalid phonetic sequence and stores said words in a repository; tracks and identifies the sequence of alphabets input by the user, and compare compares the sequence of alphabets input by the user with the words stored in the repository, and determines whether the sequence of alphabets input by the user form at least a part of a word stored in the repository; cooperates with the plurality of keypad layers to identify the selectable keys having alphabets, which in combination with the alphabets input by the user, would result in formation of an unpronounceable word; and disables selection of the identified keys.

6. The identifier as claimed in claim 5, wherein said identifier further identifies phonetically similar words, said identifier further stores said phonetically similar words in the repository, said identifier still further identifies a sequence of alphabets input by the user and replaces the sequence of alphabets input by the user with a phonetically similar word extracted from the repository, only in an event that the sequence of alphabets input by the user is deemed to be grammatically incorrect.

7. A computer implemented method for enabling a user to input alphabets in an Indian Language, via a user interface, said method comprising the following computer implemented steps:
generating, based on a script-grammar corresponding to the Indian language, a default keypad layer comprising a plurality of alphabets represented as selectable vowels and consonants:
generating, based on the script-grammar corresponding to the Indian language, a first keypad layer comprising the vowels and consonants and a plurality of modifiers;
generating, based on the script-grammar corresponding to the Indian language, a second keypad layer comprising a plurality of matras, a plurality of halants, the vowels and the consonants, wherein said matins are formed by selectively combining the vowels and the consonants;
generating, based on at least the script-grammar corresponding to the Indian language, a third keypad layer comprising the plurality of matras and the plural y of modifiers;
integrating said default keypad layer, first keypad layer, second keypad layer and third keypad layer into a display enabled keypad layout;
displaying said keypad layout on the user interface;
providing the user with an access to at least said default keypad layer of the keypad layout;
triggering a display of the first keypad layer subsequent to selection of a vowel on the default keypad layer, and triggering a display of the second keypad layer, in an event that a consonant has been selected from the default keypad layer;
retriggering the display of the default keypad layer in an event that a modifier has been selected from the first keypad layer, and triggering a display of the third keypad layer in an event that a consonant has been selected from the first keypad layer, and generating a trigger to retain the display of the first keypad layer, in an event that a vowel has been selected via the first keypad layer;
retriggering the display of the default keypad layer subsequent to selection of a halant from said second keypad layer, and retriggering te6display of the first keypad layer, in an event that a matra has been selected via said second keypad layer; and
retriggering the display of the default keypad layer, subsequent to selection of a modifier from the third keypad layer, and retriggering the display of the default keypad layer, subsequent to selection of a matra from the third keypad layer.

8. The method as claimed in claim 7, wherein the step of generating a default keypad layer further comprises the following steps:
generating a default base layer comprising un-aspirated consonants;
generating a default toggle layer aspirated consonants; and
integrating said default base layer and default toggle layer onto the default keypad layer.

9. The method as claimed in claim 7, wherein the step of generating a first keypad layer further comprises the following steps: generating a first base layer comprising un-aspirated consonants and the modifiers: generating a first toggle layer, said first toggle layer having only the aspirated consonants; and integrating said first base layer and first toggle layer onto the first keypad layer.

10. The method as claimed in claim 9, wherein the step of generating a first toggle layer further includes the step of incorporating said modifiers onto the first toggle layer only after at least one vowel or at least one consonant has been selected by the user from the first base layer.

11. The method as claimed in claimed 7,herein the method further comprises the following steps:
   identifying combinations of unpronounceable alphabets and combinations of alphabets that form an invalid phonetic sequence; and
   disabling, on the display enabled keypad layout, selection of combination of alphabets identified as being unpronounceable and having the invalid phonetic sequence.

12. The method as claimed in claim 11, wherein said method further includes the following steps:
   identifying words having the invalid phonetic sequence and storing said words in a repository;
   identifying the sequence of alphabets input by the user, and comparing the sequence of alphabets input by the user with the words stored in the repository, and determining whether the sequence of alphabets input, by the user form at least a part of a word stored in the repository;
   cooperating with the plurality of keypad layers to identify the keys having alphabets, which in combination with the alphabets input by the user, would result in formation of an unpronounceable word; and
   disabling selection of identified keys.

13. The method as claimed in claim 12 wherein the method further includes the following steps:
   identifying phonetically similar words, storing said words in the repository;
   identifying a sequence of alphabets input by the user and automatically replacing the sequence of alphabets input by the user with a phonetically similar word extracted from the repository, only in an event that the sequence of alphabets input by the user is deemed to he grammatically incorrect.

14. A non transitory computer readable medium, having computer readable instructions stored thereupon, said computer readable instructions when executed by a processor, configured to cause a computer enabled device to:
   generate, based on a script-grammar corresponding to an Indian language, a default keypad layer comprising a plurality of alphabets represented as selectable vowels and consonants;
   generate, based on the script-grammar corresponding to the Indian language, a first keypad layer comprising the vowels and the consonants and a plurality of modifiers;
   generate, based on the script-grammar corresponding to the Indian language, a second keypad layer comprising a plurality of matras, a plurality of halants, the vowels, and the consonants, wherein said matras are formed by selectively combining the vowels and the consonants;
   generate, based on the script-grammar corresponding to the Indian language, a third keypad layer comprising the plurality of matras and the plurality of modifiers;
   integrate said default keypad layer, first keypad layer, second keypad layer and third keypad layer into a display enabled keypad layout;
   display said keypad layout on a user interface of the computer enabled device, and provide a user with an access to at least said default keypad layer of the keypad layout;
   trigger a display of the first keypad layer subsequent to the selection of a vowel on the default keypad layer, and trigger a display of the second keypad layer, in an event that a consonant has been selected from the default keypad layer;
   retrigger a display of the default keypad layer in the event that a modifier has been selected from the first keypad layer, and trigger a display of the third keypad layer in an event that a consonant has been selected from the first keypad layer, and generate a trigger to retain the display of the first keypad layer, in an event that a vowel has been selected via the first keypad layer;
   retrigger the display of the default keypad layer, subsequent to selection of a halant from said second keypad layer, and retrigger the display of the first keypad layer, in an event that a matra has been selected via said second keypad layer; and
   retrigger the display of the default keypad layer, subsequent to selection of a modifier from the third keypad layer, and retrigger the display of the default keypad layer, subsequent to selection of a matra from the third keypad layer.

15. The non transitoiy computer readable medium as claimed in claim 14, wherein said computer readable instructions, when executed by a processor are further configured to enable a computer enabled device to:
   generate a default base layer comprising un-aspirated consonants;
   generate a default toggle layer comprising aspirated consonants;
   integrate said default base layer and default toggle layer onto the default keypad layer;
   generate a first base layer comprising the un-aspirated consonants;
   generate a first toggle layer, said first toggle layer haying only the aspirated consonants;
   integrate said first base layer and first toggle layer onto the first keypad layer;
   incorporate said modifiers onto the first toggle layer, only after at least one vowel or at least one consonant has been selected by the user from the first base layer;
   identify words having an invalid phonetic sequence and store said words in a repository;
   identify the sequence of alphabets input by the user, and compare the sequence of alphabets input by the user with the words stored in the repository, and determine whether the sequence of alphabets input by the user form at least a part of a word stored in the repository;
   cooperate with the plurality of keypad layers to identify keys having alphabets, which in combination with the alphabets input by the user, would result in formation of an unpronounceable word;
   disable selection of identified keys;
   identity phonetically similar words, and storing the phonetically similar words in the repository; and
   identify a sequence of alphabets input by the user and automatically replace the sequence of alphabets input by the user with a phonetically similar word extracted from the repository, only in an event that the sequence of alphabets input by the user is deemed to be grammatically incorrect.

* * * * *